United States Patent Office 3,823,165
Patented July 9, 1974

3,823,165
PHARMACEUTICALLY ACTIVE COMPOUNDS
Hugh Cairns and Peter Bennett Johnson, Loughborough, England, assignors to Fisons Limited, Suffolk, England
No Drawing. Continuation-in-part of application Ser. No. 871,972, Oct. 28, 1969, now Patent No. 3,673,218. This application Apr. 22, 1971, Ser. No. 136,579
Claims priority, application Great Britain, Apr. 25, 1970, 20,002/70
Int. Cl. C07d 7/34
U.S. Cl. 260—345.2     16 Claims

ABSTRACT OF THE DISCLOSURE

Compounds of formula I

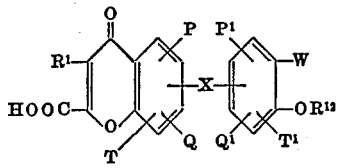

in which

P, Q, T, P¹, Q¹ and T¹ may be the same or different and each may be selected from hydrogen or a substituent other than hydrogen,
R¹ is hydrogen or a substituted or unsubstituted alkyl or alkoxy group containing from 1 to 10 carbon atoms or a substituted or unsubstituted aryl group,
R¹² is hydrogen, a group —COCH₂R¹, an alkyl group, or an alkyl substituted allyl group containing up to 6 carbon atoms,
X is a carbon to carbon bond or a single atom, which single atom may carry substituents which do not form part of the linkage itself between the two benzene nuclei, and
W represents a hydrogen atom or a —COCH₂R¹ group,
and pharmaceutically acceptable derivatives thereof are provided, the compounds being useful as intermediates and also as antagonists of the slow-reacting substance of anaphylaxis (SRS-A). Pharmaceutical compositions containing the compounds of formula I and processes for making the compounds of formula I are also described.

This application is a continuation in part of application Ser. No. 871,972 filed Oct. 28, 1969, now U.S. Pat. No. 3,673,218.
This invention relates to chromone-2-carboxylic acids, their preparation and compositions containing them.
According to our invention we provide compounds of formula I,

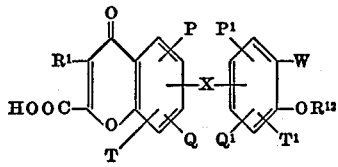

in which

P, Q, T, P¹, Q¹ and T¹ may be the same or different and each may be selected from hydrogen or a substituent other than hydrogen,
R¹ is hydrogen or a substituted or unsubstituted alkyl or alkoxy group containing from 1 to 10 carbon atoms or a substituted or unsubstituted aryl group,
R¹² is hydrogen, a group —COCH₂R¹, an alkyl group, or an alkyl substituted allyl group containing up to 6 carbon atoms, X is a carbon to carbon bond or a single atom, which single atom may carry substituents which do not form part of the linkage itself between the two benzene nuclei, and
W represents a hydrogen atom or a —COCH₂R¹ group,
and pharmaceutically acceptable derivatives thereof.
According to our invention we also provide processes for the production of a compound of formula I, and pharmaceutically acceptable derivatives thereof, which comprise
(a) Producing a compound of formula Ia,

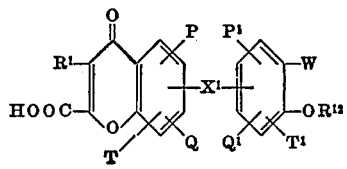

in which

P, Q, T, P¹, Q¹, T¹, R¹, R¹² and W are as defined above and
X¹ represents a sulphur or oxygen atom,
by reacting a compound of formula II,

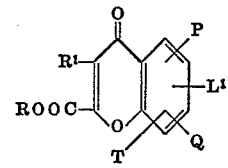

in which

P, Q, R¹ and T are as defined above,
L¹ is a good leaving group or a group —X¹Y, Y being hydrogen or an alkali metal, and
R is hydrogen or, together with the group OOC—, forms an ester group,
with a compound of formula III,

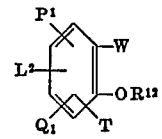

in which

P¹, Q¹, T¹, R¹² and W are as defined above, and
L² is a good leaving group when L¹ is a group —X¹Y, and a group —X¹Y when L¹ is a good leaving group, (b) Producing a compound of formula I by cyclisation of the groups A¹ and A² in a corresponding compound of formula VI,

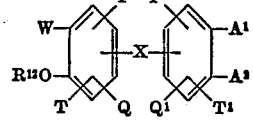

in which

P, Q, T, P¹, Q¹, T¹, W, R¹² and X are as defined above, and
A¹ and A² represent the pairs of groups (i)
    —COCHR¹COCOR⁶, and —OM,
or
(ii)
    —H and —O—C(COOM)=CR¹—COOM in which
R⁶ is an —OM group, or a group convertible thereto, M is hydrogen or an alkali metal, and
$R^1$ is as defined above, (c) Producing a compound of formula Ic,

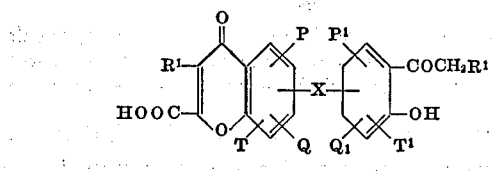

Ic in which P, Q, T, $P^1$, $Q^1$, $T^1$, $R^1$ and X are as defined above, by
(i) subjecting to a Fries rearrangement a corresponding compound of formula Id,

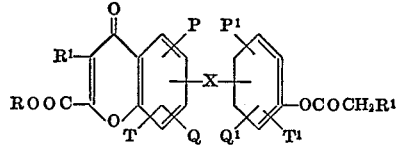

Id in which P, Q, T, $P^1$, $Q^1$, $T^1$, $R^1$, R and X are as defined above, and
(ii) opening the pyrone ring of a single chromone nucleus in a corresponding compound of formula VIII,

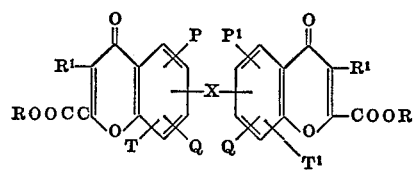

VIII in which P, Q, T, $P^1$, $Q^1$, $T^1$, R, $R^1$ and X are as defined above, under alkaline conditions, (d) Producing a compound of formula I by hydrolysing or oxidising a corresponding compound of formula IX,

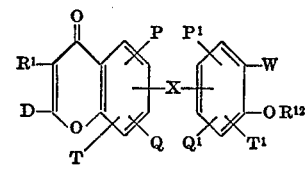

IX in which
P, Q, T, $P^1$, $Q^1$, $T^1$, X, W, $R^{12}$ and $R^1$ are as defined above, and
D represents a group which is hydrolysable or oxidizable to a —COOH group, (e) Producing a compound formula I by dehydrogenating a corresponding compound of formula X,

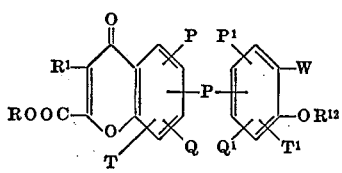

X in which P, Q, T, $P^1$, $Q^1$, $T^1$, X, W, $R^1$, $R^{12}$ and R are as defined above, (f) Producing a compound of formula If,

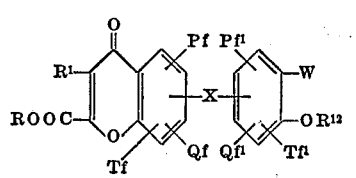

If in which
$R^1$, X, W, $R^{12}$ and R are as defined above, and
Pf, Qf, Tf, $Pf^1$, $Qf^1$ and $Tf^1$ have the same significances as P, Q, T, $P^1$, $Q^1$ and $T^1$ above, save that at least one of Pf, Qf, Tf, $Pg^1$, $Qf^1$ and $Tf^1$ represent an alkyl group containing at least two carbon atoms, by selectively hydrogenating a corresponding compound of formula XI,

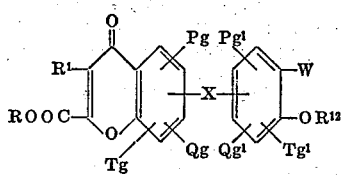

XI in which $R^1$, X, W, $R^{12}$ and R are as defined above, and Pg, Og, Tg, $Pg^1$, $Qg^1$ and $Tg^1$ have the same significances as P, Q, T, $P^1$, $Q^1$, and $T^1$ above, save that at least one of Pg, Qg, Tg, $Pg^1$, $Qg^1$ and $Tg^1$ represent an alkenyl group, (g) Producing a compound of formula Ig,

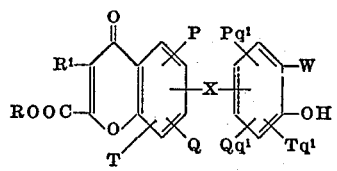

Ig in which

P, Q, T, $R^1$, X, W and R are as defined above, and $Pq^1$, Qq1 and $Tq^1$ have the same significances as $P^1$, $Q^1$ and $T^1$ above save that at least one of $Pq^1$, $Qq^1$ and $Tq^1$ represents an allyl group or an alkyl substituted allyl group containing up to 6 carbon atoms, by subjecting a compound of formula Ij,

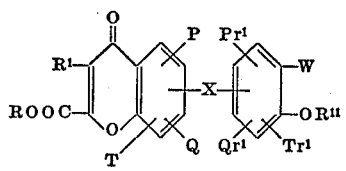

Ij in which

P, Q, T, $R^1$, X, W and R are as defined above, $Pr^1$, $Qr^1$ and $Tr^1$ have the same significances as $P^1$, $Q^1$ and $T^1$ above, save that at least one of $Pr^1$, $Qr^1$ and $Tr^1$ repersent hydrogen, and
$R^{11}$ represents an alkyl group or an alkyl substituted allyl group containing up to 6 carbon atoms, to an elevated temperature, (h) Producing a compound of formula Id by reacting a compound of formula Ih,

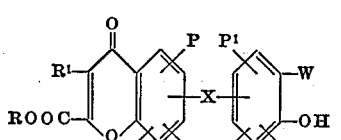

Ih in which P, Q, T, $P^1$, $Q^1$, $T^1$, X, W, $R^1$ and R are as defined above, with a compound of formula $R^1CH_2COOH$ or an anhydride or halide thereof, or (i) producing a compound of formula Ik,

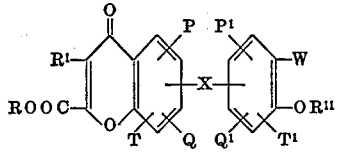

in which P, Q, T, $P^1$, $Q^1$, $T^1$, W, $R^1$, R, X and $R^{11}$ are as defined above, by reacting a compound of formula Im,

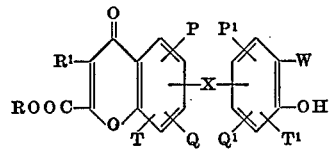

in which P, Q, T, $P^1$, $Q^1$, $T^1$, W, X, $R^1$ and R are as defined above, with a compound of formula $R^{11}Hal$, in which $R^{11}$ is as defined above and Hal represents a reactive halogen atom, and where desired or necessary converting compound of formula I to a pharmaceutically acceptable derivative thereof, or vice versa.

In process (a) $L^1$ may be a reactive halogen atom, for example iodine, or may be a suitably reactive anion forming group, for example a p-toluene sulphonate or a methyl sulphonate group. It is preferred that Y is an alkali metal atom. The reaction may, if desired, be carried out in the presence of a catalyst, for example cuprous iodide. The reaction may be carried out in a solvent which is inert under the reaction conditions, for example 2:4:6 trimethylpyridine and is desirably carried out at an elevated temperature, e.g. from about 100° to 170° C.

The cyclisation of process (b) (i) may be carried out by heating, or under basic of neutral conditions. It is however preferred to carry out the cylisation in the presence of an acid, e.g. hydrochloric acid, and in a solvent which is inert under the reaction conditions. The reaction may be carried out at from about 20° to 150° C. The group —$COR^6$ is preferably a group which is hydrolysable to a —COOH group, e.g. an ester group.

The cyclisation of process (b) (ii) may be carried out by treating the compound of formula VI with a cyclising agent, for example a dehydrating agent such as polyphosphoric, chlorosulphonic or sulphuric acid. The reaction is preferably carried out under anhydrous conditions. Alternatively cyclisation may be achieved by converting the free carboxy groups of the compound of formula VI to acyl halide, e.g. acylchloride, groups and subjecting the resulitng acyl halide to an intramolecular Friedel Crafts reaction.

Process (c) (i) may be carried out under conditions conventional for a Fries rearrangement, for example by treating the compound of formula Id with aluminum chloride or titanium chloride at an elevated temperature in a solvent which is inert under the reaction conditions, e.g. nitrobenzene.

Process (c) (ii) may be carried out by using just sufficient alkali to hydrolyse one of the chromone nuclei in the compound of formula VIII. Thus the reaction may be carried out by treating 1 equivalent of an acid of formula VIII with 1 equivalent of an alkalis metal hydroxide, e.g. sodium hydroxide. When an ester of formula VIII is used, or the compound of formula I is desired in the form of a salt, a greater proportion of alkali should be used.

In process (d) the group D may be an ester, amide or nitrile group, each of which may be hydrolysed to a —COOH group. The hydrolysis may be carried out using conventional techniques, for example an ester may be hydrolysed using a base, e.g. sodium hydroxide, carbonate or bicarbonate, in an aqueous alcoholic medium. The amide may be hydrolysed under acidic conditions, e.g. by refluxing in a solution of hydrogen bromide in acetic acid. The nitrile likewise may be hydrolysed under acidic conditions, e.g. by refluxing in a solution of hydrogen chloride in dioxan. Alternatively the group D may be an alkyl, e.g. methyl, an aralkenyl, e.g. styryl, an acyl, e.g. acetyl, or an aldehyde, e.g. formyl group. The oxidation may be carried out using conventional techniques, for example an alkyl group may be oxidised using selenium dioxide, e.g. under reflux in aqueous dioxan, or chromic acid, e.g. under reflux in aqueous acetic acid. Aralkenyl groups may be oxidised using, for example neutral or alkaline potassium permanganate in aqueous ethanol and acyl groups may be oxidised using, for example chromic acid or an aqueous hypochlorite, e.g. sodium hydrochlorite. Aldehyde groups may be oxidised using, for example chromic acid or silver oxide..

The dehydrogenation of process (e) may be carried out by oxidation using, for example selenium dioxide, palladium black or chloranil in a solvent which is inert under the reaction conditions, e.g. amyl alcohol; the reaction is preferably carried out at an elevated temperature, e.g. under reflux. Alternatively the dehydrogenation may be carried out indirectly by halogenation followed by dehydrohalogenation, for example by treatment with N-bromosuccinimide or pyridinium bromide perbromide in a solvent which is inert under the reaction conditions, followed by dehydrobromination of the resulting 3-bromo compound.

The hydrogenation of process (f) may be carried out in a solvent which is inert under the reaction conditions, for example ethylacetate, and in the presence of a hydrogenation catalyst, for example palladium or platinum on charcoal. The reaction may suitably be carried out at room temperature under atmospheric, slightly greater than atmospheric pressure.

In process (g) the reaction may be carried out under conditions conventional for a Claisen rearrangement.

In process (h) the reaction may be carried out under conditions conventional for carrying out acylation reactions, for example in a solvent which is inert under the reaction conditions, e.g. dry pyridine.

In process (i) the Hal atom may be, a bromine atom, and the reaction may be carried out in a solvent which is inert under the reaction conditions, e.g acetone, in the presence of an acid binding agent, e.g. potassium carbonate, and if desired in the presence of a catalyst, e.g. potassium iodide.

In all the processes mentioned above, the group R may be a lower alkyl group, for example an ethyl group.

Compounds of formulae II and III are either known or may be made in ways analogous to those known for the manufacture of similar known compounds.

Compounds of formula VI in which $A^1$ and $A^2$ represent the pair of groups —$COCHR^1COCOR^6$ and —OM may be made by reacting a compound of formula VIa,

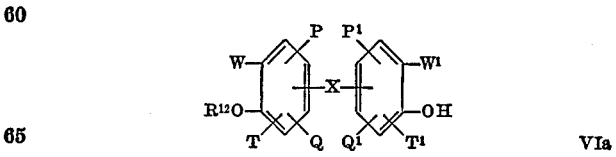

in which

P, Q, T, $P^1$, $Q^1$, $T^1$, X, $R^{12}$ and W are as defined above, and $W^1$ is a —$COCH_2R^1$ group, with sufficient amount of a compound of formula $R^6COCOR^6$ to convert $W^1$ to a group

—$COCHR^1COCOR^6$.

Compounds of formula VI in which $A^1$ and $A^2$ represent the pairs of groups —H and

—O—C(COOM)=CH—COOM may be made by reacting a compound of formula VIb,

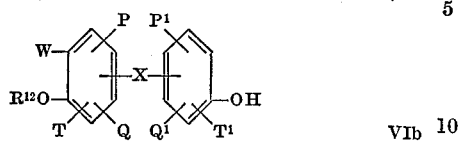
VIb in which P, Q, T, $P^1$, $Q^1$, $T^1$, X, $R^{12}$ and W are as defined above, with sufficient dialkyl-, e.g. dimethyl-acetylene dicarboxylate to convert only the —OH group on the ring which does not carry the group —W, to a group —O—C(COO alkyl)=CH—COO alkyl, and hydrolysing the product to give the desired

—O—C(COOM)=CH—COOM groups.

Compound of formula VIII may be treating a compound of formula VIIIa.

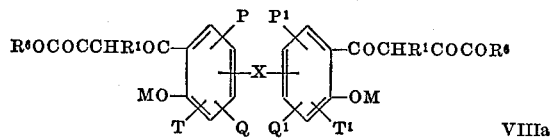
VIIIa in which P, Q, T, $P^1$, $Q^1$, $T^1$, M, X, $R^1$ and $R^6$ are as defined above, with acid.

Compounds of formula VIIIa may be prepared, for example by reacting a compound of formula VIIIb,

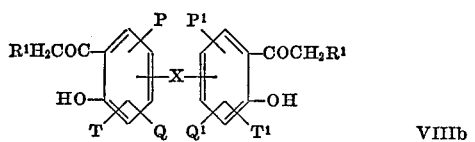
VIIIb in which P, Q, T, $P^1$, $Q^1$, $T^1$, $R^1$ and X are as defined above, with a compound of formula $R^6COCOR^6$, e.g. diethyl oxalate.

Compounds of formulae VIa, VIb and VIIIb may be made by linking the corresponding monobenzenoid compounds by processes analogous to process (a), above or using other known techniques or, when X is a carbon-carbon bond, by an Ullman reaction, or when X is a —$CH_2$— group by reacting an appropriate activated dihydroxy benzene with di-iodo methane under alkaline conditions in the presence of an inert solvent, condensation of an appropriate phenol with formaldehyde, or by using a benzyl halide (or benzoylhalide with subsequent reduction) in a Friedel-Crafts reaction.

Compounds of formula IX may be made by methods analogous to those given above for the production of compounds of formula I or may, in certain cases, be produced from compounds of formula I.

Compounds of formula X may be made by selective hydrogenation of the corresponding compound of formula I, or may be made by cyclising, for example by treatment with a base in a solvent which is inert under the reaction conditions, a compound of formula XII,

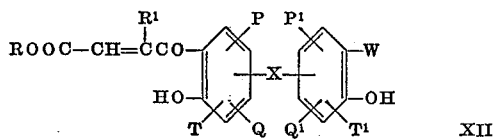
XII in which P, Q, T, $P^1$, $Q^1$, $T^1$, W, X, $R^1$ and R are as defined above Compounds of formula XII may be made by reacting a compound of formula VIa with glyoxalic acid or an ester thereof, or by reacting a compound of formula VIb with maleic anhydride in a suitable solvent and in the presence of a Lewis acid, e.g. aluminium chloride.

The compounds of formula I are useful as intermediates in the preparation of compounds of formula VIII, the compounds of formula VIII themselves being indicated for use at a dosage of from 0.1 to 50 mgs. in the treatment of allergic asthma. The compounds of formula I may be converted to compounds of formula VIII by methods analogous to those described above for the production of compounds of formula VIII, and for the production of compounds of formula I via compounds of formula VI.

The compounds of formula I and their pharmaceutically acceptable derivatives, for example their pharmaceutically acceptable salts, esters and amides, for example their sodium and lower alkylamine, e.g. ethylamine, salts, and their amides with amino acids, e.g. glycine are also useful because they possess pharmacological properties. In particular the compounds are antagonists of the slow-reacting substance of anaphylaxis (SRS–A), or its pathological effects, as is indicated for example by their activity in the following tests:

(1) SRS–A (obtained by collecting the perfusate from the lungs of ovalbumen sensitised guinea-pigs during the period 1½–10 mins. after antigen challenge) is used to produce repetitive reproducible submaximal contractions of an isolated guinea-pig ileum preparation in the presence of an antihistamine (to prevent interference from histamine which is also present in the preparations of SRS–A). The anti SRS–A activity of the compound is determined as the dose (added to the ileum 30 seconds before SRS–A) necessary to reduce the SRS–A induced contractions by 50%.

(2) SRS–A [obtained as in (1)] is injected intravenously at 10 min. intervals into anaesthetized guinea-pigs pretreated with an anti-histamine while recording resistance to inflation during artificial respiration. Repetitive bronchoconstrictor responses of similar size are obtained with suitable doses of SRS–A. The in vivo anti SRS–A activity of the compound when administered intravenously is determined as the minimal dose which will significantly ($P<0.05$) inhibit SRS–A induced bronchoconstriction. Additionally, the compound is tested for its activity after aerosol inhalation, or oesophagal administration.

The compounds also have the same utility as the compounds of Dutch Patent Specification No. 68,11740, i.e. they inhibit the release and/or action of toxic products which arise from the combination of certain types of antibody with specific antigen and are therefore indicated for use in the treatment of extrinsic allergic asthma.

The compounds are thus indicated for use in the treatment of disorders in which SRS–A is a factor, for example skin afflictions, hay fever and obstructive airways diseases, e.g. asthma.

For the above-mentioned uses, the dosage administered will, of course, vary depending upon the compound employed, mode of administration and treatment desired. However, in general, satisfactory results are obtained when administered at a daily dosage of from about 1 milligram to about 10 milligrams per kilogram of animal body weight, preferably given in divided doses 2 to 4 times a day or in sustained release form. For the larger mammals, the total daily dosage is in the range of from about 50 milligrams to about 700 milligrams, and dosage forms suitable for oral administration comprise from about 12 milligrams to about 350 milligrams of the compound admixed with a solid or liquid pharmaceutical carrier or diluent. The components may be administered during or before the attack of the disorder to be treated.

The compounds may be administered as a sterile admixture with a pharmaceutically acceptable diluent or carrier, the composition used depending on many factors including the disorder to be treated. Thus the invention provides such an admixture, and also a process for making it, which comprises mixing the active ingredient with the carrier or diluent. The compounds may be administered parenterally, orally, by inhalation or topically.

The invention also provides a process for the production of a pharmaceutically acceptable salt of a compound of formula I, which process comprises treating a compound of formula I, an ester thereof or another salt thereof with an appropriate base, e.g. a sodium base.

Other pharmaceutically acceptable derivatives of the compounds of formula I, e.g. esters and amides (simple amides or amides derived from an amino acid such as glycine) may be made from the compounds of formula I using conventional techniques.

The —X— atom may be an oxygen or sulphur atom, may be a substituted sulphur or nitrogen atom or may be a methylene group or a substituted methylene group. Specific examples of such substituted atoms are the group —SO—, —SO$_2$—, —CO—, >NH and >NR$^2$ groups [where R$^2$ is an alkyl, alkenyl, alkoxy, aralkyl, aryl, acyl, hydroxy, carboxy or a carbocyclic or heterocyclic ring, which groups or rings preferably contain less than 10 carbon atoms or such groups or rings carrying a hydroxy, halogen, lower alkyl, lower alkoxy or phenyl substituent, e.g. a >NCH$_3$ or >NC$_3$H$_7$ group.

Where —X— is a substituted methylene group, it may have the formula >C(R$^3$)$_2$, wherein each R$^3$ may be the same or different and is hydrogen; hydroxy; halogen; an alkyl, alkenyl or alkynyl group which may have a carbon atom therein replaced by an oxygen, sulphur or nitrogen atom or a carbonyl group or an amide or ester linkage, which alkyl, alkenyl or alkynyl groups may carry a halogen, hydroxy, carboxy or alkoxy substituent; a carboxylic acid group (including salts, esters and amides thereof); an aryl, aralkyl, aryloxy or aralkoxy group which may carry any of the substituents listed above; or a heterocyclic or carbocyclic ring which may carry any of the substituents listed above. The methylene group may also have substituents linked thereto by double bonds as is the case with the groups >C=O, >C=C<, >C=S or >C=N—. The substituted methylene group preferably contains less than 10 carbon atoms.

Preferred forms of —X— linkage are those wherein the —X— atom or substituted atom is >CH$_2$, >CHOH, >C(R$^4$)$_2$, >C=O, >CHCOOH, >CHCOOR$^4$,
>C=CCl$_2$,

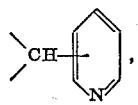

>NH, —S—, —SO—, —SO$_2$— and —O—; R$^4$ being a lower alkyl group, e.g. ethyl, propyl or pentyl.

The term lower is used herein to mean a group containing from 1 to 6 carbon atoms.

The P, Q, T, P$^1$, Q$^1$ and T$^1$ substituents may be alkyl, e.g. containing from 1 to 8 carbon atoms, which may be straight or branched (e.g. methyl, ethyl or isopropyl groups), and which may carry one or more hydroxy, lower alkoxy or halo substituents, e.g. a hydroxymethyl, hydroxy propyl, ethoxyethyl, or chloromethyl group; alkoxy corresponding to the above alkyl groups, e.g. an isopropoxy, a hydroxypropoxy or an ethoxyethoxy group; alkenyl or alkenyloxy corresponding to such alkyl or alkoxy groups; amino which may carry a substituent, e.g. a mono- or di-lower alkyl amino group; amino-lower alkoxy which may carry a substituent e.g. a di-lower alkylamino lower alkoxy group; a nitro group; a hydroxy group; or a halogen atom. Specific examples of the groups P, Q, T, P$^1$, Q$^1$ and T$^1$ are chloro, bromo, iodo, hydroxy, acetoxy, nitro, methyl, ethyl, propyl, butyl, tert. butyl, allyl, 1-methyl-allyl, prop-1-enyl, methoxy, ethoxy, propoxy, butoxy, allyloxy, but-3-enoxy, acetyl, hydroxymethyl, ethoxymethyl, chloromethyl, 2-chloroethoxy, 2-iodoethoxy, 2-hydroxyethoxy, 2-hydroxypropoxy, 3-hydroxypropoxy, 2,3-dihydroxypropoxy, 2-hydroxybutoxy, 3-methylbutoxy, 2-ethoxyethoxy, 3-methoxy-2-hydroxypropoxy, 3-butoxy-2-hydroxypropoxy, diethylaminoethoxy, aminoethylamino, acetylamino or hydrogen.

R$^1$ may be lower alkyl, e.g. a methyl, ethyl, propyl, or pentyl; lower alkoxy; or phenyl. It is preferred that both R$^1$ groups be hydrogen.

Preferred compounds of formula I are those in which the —X— group is linked to the 6 or 7 position of the chromone nucleus. It is also preferred that the —X— group should be linked in a position *para* to either the —OH group or the —COCH$_2$R$^1$ group.

A preferred group of compounds are those in which the X group is a sulphur or oxygen atom or a —CH$_2$— group, in which all of P to T$^1$ are hydrogen or only one of them is lower alkoxy, lower alkyl or lower alkenyl and in which both R$^1$ groups are hydrogen.

The invention is illustrated, but in no way limited by the following Examples in which the temperatures are in degrees centigrade and the parts are by weight.

EXAMPLE 1

6-(3-Acetyl-4-hydroxyphenylthio)-4-oxo-4H-1-benzopyran-2-carboxylic acid (a) 4-Iodophenoxy fumaric acid dimethyl ester.—A solution of *p*-iodophenol (119 g.) acetylene dicarboxylic acid dimethyl ester (71 g.) and benzyl trimethyl ammonium hydroxide solution (40% w./v. in water) (1 ml.) in ethanol (250 ml.) was refluxed for 10 mins., cooled, filtered and washed with ethanol to yield 4-iodophenoxyfumaric acid dimethyl ester m.p. 95–8° C. Recrystallisation from ethanol raised m.p. to 101–2° C.

*Analysis.*—Found: C, 40.1%; H, 2.95%; M.W. (Mass Spec), 362. C$_{12}$H$_{11}$IO$_5$ requires: C, 39.8%; H, 3.04%; M.W., 363.

(b) 4-Iodophenoxyfumaric acid.—A solution of 4-iodophenoxyfumaric acid dimethyl ester (72.4 g.) and sodium hydroxide (16.5 g.) in 50% w./v. aqueous ethanol was refluxed for 2 hrs. The solution was acidified and ethanol was evaporated off. The yellow solid which deposited on cooling was filtered, washed with water and recrystallised from water to give 4-iodophenoxyfumaric acid m.p. 229–34° C. Recrystallisation from water raised m.p. to 237–8° C.

*Analysis.*— Found: C, 36.1%; H, 1.96%. C$_{10}$H$_7$IO$_5$ Requires: C, 35.9%; H, 2.1%.

(c) 2-Carboxy-6-iodochromone.—A mixture of 4-iodophenoxyfumaric acid (33.4 g.) and concentrated sulphuric acid (66 ml.) was heated on a water bath for 10 mins. The resulting solution was poured into stirred ice-water (1 l.). The solid which deposited was filtered, washed with water and crystallised from ethanol to give 2-carboxy-6-iodochromone m.p. 258–61° C. Recrystallisation from ethanol raised m.p. to 262–63° C.

*Analysis.*—Found: C, 38.0%; H, 1.53%; M.W. (Mass Spec), 316±3. C$_{10}$H$_5$IO$_4$ Requires: C, 38.0%; H, 1.58%; M.W., 316.

(d) 2-Ethoxycarbonyl-6-iodochromone.—2-Carboxy-6-iodochromone (15.8 g.) was suspended in ethanol (100 ml.) and heated to reflux. A slow stream of hydrogen chloride gas was passed through the refluxing suspension for 90 mins. The suspension was then cooled, filtered, and washed with ethanol to give 2-ethoxycarbonyl m.p. 147–9° C.

*Analysis.*—Found: C, 41.8%; H, 2.48%; I, 36.4%; M.W. (Mass Spec), 344. C$_{12}$H$_9$IO$_4$ Requires: C, 41.87%; H, 2.62%; I, 36.9%; M.W. 344.

The structure was confirmed by N.M.R.

(e) 2-Hydroxy-5-mercaptoacetophenone.—To a stirred solution of 5-amino-2-hydroxyacetophenone hydrochloride (93.8 g.) in aqueous hydrochloric acid (62.5 ml. concentrated hydrochloric acid diluted to 300 ml.) was added dropwise a solution of sodium nitrite (35 g.) in water (75 ml.). The temperature throughout the addition was maintained between 15 and 20° C. Stirring was continued for an hour, and the resultant solution then added slowly, over a period of one hour, to a solution of potassium xanthate (112 g.) in water (250 ml.) at a temperature of 70–75° C. After raising the temperature to 90° C. for a further 30 minutes, a slow stream of nitrogen was passed through the mixture, and sodium hydroxide (80 g.) added. The resultant solution was refluxed under nitrogen for 16 hours, cooled and acidified with 50% sulphuric acid (250 ml.). The product was extracted into benzene (2× 125 ml.) and a solid which separated out between the two layers was filtered off and kept. The combined extracts were washed with water, dried over sodium sulphate, and evaporated to leave an oil. This oil was distilled under reduced pressure using a nitrogen bleed. 2-Hydroxy-5-mercaptoacetophenone b.p. (0.3 mm.) 100° C. was obtained. On standing the compound solidified and had an m.p. 58–60° C.

The solid separated during the benzene extraction was 4,4¹-dihydroxy-3,3¹-diacetyldiphenyl disulphide (33 g.). This solid was refluxed with stannous chloride (82.5 g.) in concentrated hydrochloric acid (300 ml.) for 5 hours. The solution was poured into concentrated hydrochloric acid (300 ml.) and extracted with chloroform (2× 250 ml.). The chloroform extracts were combined, dried over sodium sulphate, and evaporated to leave an oil, which was then extracted with petrol ether (b.p. 40–60° C.) to produce further 2-hydroxy-5-mercaptoacetophenone m.p. 58–60° C.

*Analysis.*—Found: C, 57.55%; H, 4.69%; S, 18.75%; M.W., 168. $C_8H_8O_2S$ Requires: C, 57.16%; H, 4.76%; S, 19.05%; M.W., 168.

(f) 6 - (3 - Acetyl-4-hydroxyphenylthio)-4-oxo-4H-1-benzopyran-2-carboxylic acid ethyl ester.—A solution of 2-hydroxy-5-mercaptoacetophenone (16.8 g.) and sodium bicarbonate (8.4 g.) in 66% v./v. aqueous ethanol (300 ml.) was refluxed for 30 mins. The solution was evaporated to dryness to leave a yellow solid. The solid was partially dried by evaporation with acetone (5×) and was finally allowed to stand in a vacuum dessicator over sodium hydroxide.

To the dried product in 2:4:6 trimethylpyridine (200 ml.) was added cuprous iodide (9.5 g.) and 2-ethoxycarbonyl-6-iodochromone (27.8 g.). The mixture was heated under a stream of nitrogen to 145–7° C. for 1 hour, cooled and acidified with concentrated hydrochloric acid. The solid was filtered off, washed with water and dissolved in chloroform. (Some disulphide was filtered off at this point). Ethanol was added and the chloroform distilled off. 6-(3-acetyl-4-hydroxyphenylthio)-4-oxo-4H-1-benzopyran-2-carboxylic acid ethyl ester crystallised out. After alumina filtration and crystallisation as above a product m.p. 172–173.5° C. was obtained.

*Analysis.*—Found: C, 62.2%; H, 4.09%; S, 8.14%; M.W. (Mass Spec) 384. $C_{20}H_{16}O_6S$ Requires: C, 62.5%; H, 4.17%; S, 8.34%; M.W., 384.

(g) 6 - (3 -Acetyl-4-hydroxy-phenylthio)-4-oxo-4H-1-benzopyran-2-carboxylic acid and sodium salt.—A suspension of 2-ethoxycarbonyl-6-(3-acetyl-4-hydroxy phenylthio) chromone (3.84 g.) and sodium bicarbonate (0.84 g.) in aqueous ethanol (100 ml., 50%) was refluxed for 4 hours.

50 ml. of the resulting solution was treated with ethanol (50 ml.) and allowed to crystallise. The resulting solid was recrystallised from water to give 6-(3-acetyl-4-hydroxy - phenylthio)-4-oxo-4H-1-benzopyran-2-carboxylic acid monosodium salt.

The remaining solution was acidified with concentrated hydrochloric acid to give 6-(3-acetyl-4-hydroxy-phenylthio)-4-oxo-4H-1-benzopyran-2-carboxylic acid m.p. 282–284° C.

EXAMPLE 2

6-(4-Hydroxyphenylthio)-4-oxo-4H-1-benzopyran-2-carboxylic acid sodium salt (a) Monothiohydroquinone sodium salt.—A mixture of 20.25 parts monothiohydroquinone and 13.5 parts sodium hydrogen carbonate was heated under reflux in a mixture of 300 parts water and 150 parts ethyl alcohol for 1 hour. The solution was evaporated to half volume and then freeze dried to obtain 23.7 parts monothiohydroquinone sodium salt as a pale yellow solid.

(b) Ethyl 6-(4-hydroxyphenylthio)-4-oxo-4H-1-benzopyran-2-carboxylate.—A mixture of 23.7 parts monothiohydroquinone sodium salt, 55 parts ethyl 6-iodo-4-oxo-4H-1-benzopyran-2-carboxylate, 15 parts cuprous iodide, and 300 parts pyridine was heated at reflux, with stirring and under a nitrogen atmosphere for 3 hours. On cooling, the mixture was acidified with concentrated hydrochloric acid, the precipitate was filtered off, washed with water, dried, and then 500 parts by volume of chloroform were added. After filtering off the insoluble material the filtrate was evaporated to dryness and chromatographed in chloroform from a column of 750 parts silica gel. The solid, obtained by evaporation of the appropriate chromatographic fractions, was recrystallised from 300 parts ethyl alcohol to yield 19.1 parts of ethyl 6-(4-hydroxyphenylthio)-4-oxo-4H-1-benzopyran-2-carboxylate as pale yellow crystals melting between 190° and 191° C.

*Analysis.*—Found: C, 63.6; H, 4.0; S, 9.6. $C_{18}H_{14}O_5S$ requires: C, 63.2; H, 4.1; S, 9.35.

(c) 6 - (4 - Hydroxyphenylthio) - 4-oxo-4H-1-benzopyran-2-carboxylic acid.—A mixture of 10.9 parts of ethyl 6 - (4 - hydroxyphenylthio)-4-oxo-4H-1-benzopyran-2-carboxylate and 8 parts sodium hydrogen carbonate in 200 parts ethyl alcohol was boiled for 2 hours and the volume was kept constant by the addition of water. The solution was acidified with concentrated hydrochloric acid, the precipitate was filtered off, washed with water, and then dried. It was recrystallised from a mixture of 150 parts of ethyl alcohol and 150 parts dioxan to obtain 7.4 parts 6 - (4 - hydroxyphenylthio) - 4-oxo-4H-1-benzopyran-2-carboxylic acid as yellow crystals, melting at 281° C. (decomposition).

*Analysis.*—Found: C, 60.8; H, 3.3; S, 10.3. $C_{16}H_{10}O_5S$ requires: C, 61.15; H, 3.2; S, 10.2.

(d) 6-(4 - Hydroxyphenylthio) - 4 - oxo-4H-1-benzopyran-2-carboxylic acid sodium salt.—To a suspension of 6.4 parts of 6-(4-hydroxyphenylthio)-4-oxo-4H-1-benzopyran-2-carboxylic acid in 150 parts of water was added 1.65 parts of sodium hydrogen carbonate and the reaction temperature was maintained at 50° C. until effervescence had ceased. After hot filtration, the solution was freeze dried to obtain 6.6 parts of 6-(4-hydroxyphenylthio)-4-oxo-4H-1-benzopyran-2-carboxylic acid sodium salt as a pale yellow microcrystalline solid.

EXAMPLE 3

6-(4-Acetyl-3-hydroxyphenylthio)-4-oxo-4H-1-benzopyran-2-carboxylic acid sodium salt (a) 4-Acetyl-3-hydroxythiophenol.—To a solution of 23.3 parts 4-acetyl-3-hydroxyaniline in 53 parts by volume of concentrated hydrochloric acid at 0° C. was added a solution of 11.8 parts sodium nitrite in 20 parts of water at a rate sufficient to maintain the temperature below 3° C. This mixture was then added during 5 minutes with stirring to a solution of 6.2 parts cupric chloride dihydrate and 5 parts water in 100 parts by volume of acetic acid saturated with sulphur dioxide. The precipitate was filtered off, dried, and then distilled under reduced pressure to obtain 13.8 parts of crude 4-acetyl-3-hydroxybenzenesulphonyl chloride as a pale yellow crystalline solid boiling between 148° and 150° at 0.8 mm. Hg.

Dry hydrogen chloride was bubbled into a stirred suspension of 80 parts of stannous chloride dihydrate in 300 parts of acetic acid until an almost clear solution was obtained, and to this was added 13.8 parts of the unpurified 4-acetyl-3-hydroxybenzenesulphonyl chloride. After stirring for 20 minutes the mixture was poured into 300 parts of concentrated hydrochloric acid, 600 parts of water were added, the precipitate was extracted with 300 parts by volume of chloroform, and it was then dried with magnesium sulphate. Evaporation of the solvent and distillation of the residue under reduced pressure yielded 8.8 parts of 4-acetyl-3-hydroxythiophenol as a pale yellow solid boiling between 100° and 102° C. at 0.5 mm. Hg.

*Analysis.*—Found: C, 56.8; H, 4.7; S, 19.1. $C_8H_8O_2S$ requires: C, 57.1; H, 4.8; S, 19.0.

(b) 4 - Acetyl-3-hydroxythiophenol sodium salt.—By the method of Example 2(a) 8.5 parts of 4-acetyl-3-hydroxythiophenol were reacted with sodium hydrogen carbonate to obtain 9.6 parts of 4-acetyl-3-hydroxythiophenol sodium salt as a pale yellow microcrystalline solid.

(c) Ethyl 6 - (4-acetyl-3-hydroxyphenylthio) - 4 - oxo-4H-1-benzopyran-2-carboxylate.—By the method of Example 2(b) 9.6 parts of 4 - acetyl-3-hydroxythiophenol sodium salt were reacted with ethyl 6-iodo-4-oxo-4H-1-benzopyran-2-carboxylate and cuprous iodide in pyridine to obtain 9.5 parts of ethyl 6-(4-acetyl-3-hydroxyphenyl-thio)-4-oxo-4H-1-benzopyran-2-carboxylate as off-white crystals melting between 183° and 184° C.

*Analysis.*—Found: C, 62.4; H, 4.25; S, 8.6. $C_{20}H_{16}O_3S$ requires: C, 62.5; H, 4.2; S, 8.3.

(d) 6-(4-Acetyl-3-hydroxyphenylthio) - 4 - oxo-4H-1-benzopyran-2-carboxylic acid sodium salt.—A mixture of 7.2 parts ethyl 6 - (4-acetyl-3-hydroxyphenylthio)-4-oxo-4H-1-benzopyran-2-carboxylate and 1.56 parts sodium hydrogen carbonate in 150 parts ethyl alcohol was boiled for 2 hours and the volume was kept constant by the addition of water. The precipitated material was filtered off and discarded and the filtrate was washed three times with 100 parts of chloroform. The aqueous phase was freeze dried to obtain 4.6 parts of 6-(4-acetyl-3-hydroxyphenyl-thio)-4-oxo-4H-1-benzopyran-2-carboxylic acid sodium salt as an off-white powdery solid.

EXAMPLE 4

6-(5-Acetyl-4-hydroxy-2-methoxyphenylthio)-4-oxo-4H-1-benzopyran-2-carboxylic acid sodium salt (a) 5-Acetyl - 4 - hydroxy-2-methoxybenzenesulphonic acid.—To a stirred solution of 100 parts 2-hydroxy-4-methoxyacetophenone in 350 parts by volume of chloroform maintained at 0° C. was added 140 parts chlorosulphonic acid at a rate sufficient to keep the temperature below 5° C. After warming to room temperature, the yellow solution was poured onto 1000 parts of crushed ice, the precipitate was filtered off, and washed with diethyl ether. This was recrystallised from a mixture of 350 parts of diethyl ether and 350 parts of ethyl alcohol to obtain 104.8 parts of 5-acetyl-4-hydroxy-2-methoxybenzenesulphonic acid as pink crystals melting between 129° and 130° C.

The structure of this compound was confirmed by its NMR spectrum [τ 7.50 (3H, S); 6.20 (3H, S); 4.55 (2H, diffuse); 3.54 (1H, S); 1.87 (1H, S)].

(b) 5-Acetyl-4-hydroxy - 2 - methoxythiophenol.—A mixture of 100 parts 5-acetyl-4-hydroxy-2-methoxy-benzenesulphonic acid and 28.1 parts potassium carbonate in 400 parts water was stirred until the evolution of carbon dioxide had ceased. The precipitate was filtered off to obtain 93.5 parts 5-acetyl-4-hydroxy-2-methoxy-benzenesulphonic acid potassium salt as a pink amorphous solid. This was refluxed for 1 hour with 300 parts by volume of phosphoryl chloride, and after cooling, the mixture was added carefully to 1000 parts of crushed ice. The resulting brown suspension was filtered off to obtain 54 parts of crude 5-acetyl-4-hydroxy - 2 - methoxybenzenesulphonyl chloride.

Dry hydrogen chloride was bubbled into a stirred suspension of 265 parts of stannous chloride dihydrate in 1000 parts acetic acid until an almost clear solution was obtained, and to this was added 54 parts of the unpurified 5-acetyl-4-hydroxy - 2 - methoxybenzenesulphonyl chloride. After stirring for 30 minutes the mixture was poured into 1000 parts of concentrated hydrochloric acid, 1000 parts of water were added, the precipitate was extracted with 500 parts by volume of chloroform, and this was dried with magnesium sulphate. Evaporation of the solvent, sublimation of the residue *in vacuo*, and recrystallisation from carbon tetrachloride yielded 29.7 parts of 5-acetyl-4-hydroxy-2-methoxythiophenol as colourless crystals melting between 127° and 128° C.

Due to rapid oxidation, satisfactory element analysis could not be obtained but the structure was confirmed by NMR spectroscopy. [τ 7.51 (3H, S); 6.50 (1H, S); 6.13 (3H, S); 3.61 (1H, S); 2.39 (1H, S); —2.56 (1H, S)].

(c) Ethyl 6-(5-acetyl - 4 - hydroxy-2-methoxyphenyl-thio)-4-oxo-4H-1-benzopyran - 2 - carboxylate.—By the method of Example 2(a) 23.4 parts of 5-acetyl-4-hydroxy-2-methoxythiophenol were reacted with sodium hydrogen carbonate to obtain 5-acetyl-4-hydroxy-2-methoxy-thiophenol sodium salt as a yellow amorphous solid. This was reacted by the method of Example 2(b) with ethyl 6-iodo-4-oxo-4H-1-benzopyran-2-carboxylate and cuprous iodide in pyridine to obtain, after recrystallisation from dioxan, 28.7 parts of ethyl 6-(5-acetyl-4-hydroxy-2-methoxyphenylthio)-4-oxo-4H-1-benzopyran - 2 - carboxylate as yellow crystals melting between 218° and 219° C.

*Analysis.*—Found: C, 60.7; H, 4.5; S, 7.6. $C_{21}H_{18}O_7S$ requires: C, 60.9; H, 4.4; S, 7.7

(d) 6 - (5-Acetyl-4-hydroxy-2-methoxyphenylthio)-4-oxo-4H-1-benzopyran-2-carboxylic acid sodium salt.—A suspension of 8.24 parts ethyl 6-(5-acetyl-4-hydroxy-2-methoxyphenylthio)-4-oxo-4H-1-benzopyran - 2 - carboxylate in 82.5 parts by volume of a 0.242N solution of sodium hydroxide in methanol, and 100 parts methanol was stirred for 3 hours, heated to reflux, and then cooled. The solid was filtered off, washed with 100 parts methanol and then triturated with 200 parts of hot methanol to obtain 3.2 parts of 6-(5-acetyl-4-hydroxy-2-methoxy-phenylthio)-4-oxo-4H-1-benzopyran-2-carboxylic acid sodium salt as pale yellow fluffy crystals.

EXAMPLE 5

6-(3-Acetyl-4-hydroxyphenoxy)-4-oxo-4H-1-benzopyran-2-carboxylic acid sodium salt (a) 2-Hydroxy-5-(4-hydroxyphenoxy)acetophenone.—A mixture of 15 parts 4-(4-hydroxyphenoxy)phenyl acetate, 25.5 parts of anhydrous aluminium chloride, and 90 parts of chlorobenzene was stirred and refluxed for 20 minutes, and then decomposed with ice to afford a yellow solid which was extracted with chloroform. The chloroform layer was washed successively with sodium hydrogen carbonate solution to remove 4,4'-dihydroxyphenyl ether formed during the reaction, 10% sodium carbonate solution, and 0.2 sodium hydroxide solution. The sodium carbonate and the sodium hydroxide layers were combined, acidified, and extracted with chloroform, which was evaporated to give a yellow solid. The solid was recrystallised from a mixture of benzene and light petroleum (b.p. 60–80) to afford 3 parts of 2-hydroxy-5-(4-hydroxyphenoxy)acetophenone, m.p. 140–141°.

*Analysis.*—Found C, 66.6; H, 4.25. $C_{18}H_{14}O_6$ requires: C, 68.8; H, 4.95%.

(b) 6 - (3-Acetyl-4-hydroxyphenoxy)-4-oxo-4H-1-benzopyran-2-carboxylic acid.—Ten parts of 2-hydroxy-5-(4-hydroxyphenoxy)acetophenone and 7 parts of dimethyl acetylene dicarboxylate were mixed in 20 parts of dioxan, and 6 drops of Triton B were added. The mixture was heated for 20 minutes on a steam bath, and then evaporated under reduced pressure to a dark oil, which was washed with water, and 0.5% sodium hydroxide, dried and evaporated. The residue was heated on a steam bath for 20 minutes with 50 parts of 30% sodium hydroxide solution, and acidified to give a gummy solid, which was taken up in sodium hydrogen carbonate solution, filtered, washed with ethyl acetate, and acidified to afford 5.5 parts of a green solid. Nuclear magnetic resonance showed the solid was a mixture of approximately 60% (3-acetyl-4-hydroxyphenoxy) fumaric acid and 40% (3-acetyl-4-hydroxyphenoxy)maleic acid. The solid was powdered, dissolved in 10 parts of concentrated sulphuric acid, and after three minutes poured into water to give 5 parts of a brown solid, which crystallised from aqueous dimethyl formamide to furnish 3 parts of a green solid, m.p. 282–283° (decomp.). The solid was dissolved in a slight excess of hot sodium hydrogen carbonate solution, filtered, cooled, and acidified, whereupon 2 parts of a cream powder, m.p. 287° (decomp.), were obtained. The powder was 6-(3-acetyl-4-hydroxyphenoxy)-4-oxo-4H-1-benzopyran-2-carboxylic acid.

(c) Sodium 6-(3-acetyl-4-hydroxyphenoxy)-4-oxo-4H-1-benzopyran-2-carboxylate.—Sodium 6 - (3-acetyl-4-hydroxyphenoxy)-4-oxo-4H-1-benzopyran - 2 - carboxylate was prepared from 6-(3-acetyl-4-hydroxyphenoxy)-4-oxo-4H-1-benzopyran-2-carboxylic acid by neutralisation with an equivalent of sodium hydrogen carbonate in distilled water and freeze-drying the resulting solution.

EXAMPLE 6

6-(4-Hydroxyphenoxy)-4-oxo-4H-1-benzopyran-2-carboxylic acid sodium salt (a) Ethyl 6 - (4-hydroxyphenoxy)-4-oxo-4H-1-benzopyran-2-carboxylate.—To a solution of sodium ethoxide, prepared from 7.5 parts of sodium and 240 parts of ethanol, was added a slurry of 45 parts of diethyl oxalate, 15 parts of 2-hydroxy-5-(4-hydroxyphenoxy)acetophenone, and 50 parts of dry ether, and the mixture was refluxed for 5 hours, cooled, poured into ether, and washed with water and then 5% sodium hydroxide solution. The combined aqueous layers were acidified, and extracted with chloroform, which was washed with water, dried, and evaporated to yield a red oil. The oil was dissolved in dry ethanol and saturated with hydrogen chloride. The solution was refluxed for 20 minutes, reduced to small volume, and treated with ethyl acetate, which was then washed with water, sodium hydrogen carbonate solution, and water, dried and evaporated to yield a buff solid, which crystallised from aqueous ethanol to give 10 parts of ethyl 6-(4-hydroxyphenoxy)-4-oxo-4H-1-benzopyran-2-carboxylate as needles, m.p. 159–160°.

*Analysis.*—Found C, 66.6; H, 4.25. $C_{18}H_{14}O_6$ requires: C, 66.3; H, 4.3%.

(b) 6-(4-Hydroxyphenoxy)-4-oxo-4H-1-benzopyran-2-carboxylic acid.—A solution of 9.5 parts of ethyl 6-(4-hydroxyphenoxy)-4-oxo-4H-1-benzopyran - 2 - carboxylate in 1000 parts of ethyl acetate was washed repeatedly with 0.3% sodium hydroxide (approximately 4000 parts in all). The combined aqueous washings were acidified to give a solid, which was recrystallised from an ethanol-acetone mixture to furnish 5.3 parts of 6-(4-hydroxyphenoxy)-4-oxo-4H-1benzopyran-2-carboxylic acid, m.p. 280–281 (decomp.)

*Analysis.*—Found: C, 64.5; H, 3.3. $C_{16}H_{10}O_6$ requires: C, 64.6; H, 3.4%.

(c) Sodium 6-(4-hydroxyphenoxy)-4-oxo-4H-1-benzopyran-2-carboxylate.—The sodium salt was prepared from 6-(4 - hydroxyphenoxy) - 4 - oxo-4H-1-benzopyran-2-carboxylic acid by the procedure in Example 5(c).

EXAMPLE 7

6-(3-Acetyl-4-hydroxybenzyl)-4-oxo-4H-1-benzopyran-2-carboxylic acid sodium salt (a) 4 - Acetoxy-4'-hydroxydiphenylmethane.—A solution of 5.6 parts of potassium hydroxide in 70 parts by volume of water was added dropwise with stirring to a solution of 20.0 parts 4,4'-dihydroxydiphenylmethane in 250 parts by volume of water and 140 parts by volume of acetone. The resulting solution was cooled to 5° C. and 10.5 parts of acetic anhydride were added slowly with stirring. The mixture was further stirred for 1 hour. The products were removed from the reaction mixture by extraction into 3× 100 parts by volume of diethyl ether. The combined ethereal extracts were washed with water and dried over anhydrous magnesium sulphate. Evaporation of the ethereal solution yielded a red oil which was taken up in chloroform and chromatographed on a column of silica gel with chloroform as eluant to give 3.7 parts of 4,4'-diacetoxydiphenylmethane, 13.0 parts of 4-acetoxy-4'-hydroxydiphenylmethane and 4.4 parts of 4,4'-dihydroxydiphenylmethane. 4-Acetoxy-4'-hydroxydiphenylmethane crystallised from benzene as colourless plates melting between 129° and 130° C.

*Analysis.*—Found: C, 74.5; H, 5.76%. $C_{15}H_{14}O_3$ requires: C, 74.34; H, 5.83%.

(b) 3 - Acetyl - 4,4'-dihydroxydiphenylmethane.—87.5 Parts of titanium tetrachloride were slowly added with stirring to a solution of 37.2 parts of 4-acetoxy-4'-hydroxydiphenylmethane in 350 parts by volume of dry, redistilled nitrobenzene maintained at 0° C. The mixture was then stirred for 14 hours at 50° C. The mixture was cooled and treated with 300 parts by volume of 6N hydrochloric acid and extracted with diethyl ether. The ethereal solution was extracted with 3× 100 parts by volume of 2N sodium hydroxide solution and the alkaline extract was acidified with concentrated hydrochloric acid to yield a suspension of a red oil which was extracted into diethyl ether. The ethereal solution was dried over anhydrous magnesium sulphate, evaporated and the residual oil was chromatographed on a column of silica gel, with chloroform as eluent, to yield 18.3 parts of 3-acetyl-4,4'-dihydroxydiphenylmethane. T.L.C. analysis showed that the product was contaminated with a small amount of 3,3'-diacetyl-4,4'-dihydroxydiphenylmethane. The product was not further purified. N.M.R. (CDCl₃ 10% solution, T.M.S.)

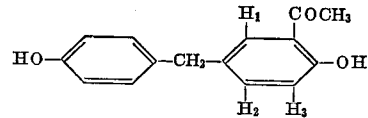

$7.51\tau$(3p singlet)—COCH₃; $6.21\tau$(2p singlet)—CH₂; $4.15\tau$(1 OHp broad)

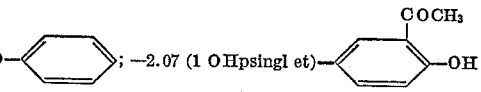

Aromatic signals: AA', BB' quartet centered at about $3.12\tau$;

$H_1$ (Meta coupled) $2.54\tau$; $H_2$(ortho and meta coupled) about $2.78\tau$;

$H_3$ (ortho coupled) about 2.9.

(c) Ethyl 6 - (3 - acetyl-4-hydroxybenzyl)-4-oxo-4H-1-benzopyran-2-carboxylate.—A solution of 8 parts of 3-acetyl-4,4'-dihydroxydiphenylmethane, 5.2 parts of dimethyl acetylenedicarboxylate and 3 drops of benzyl trimethyl ammonium hydroxide in 30 parts by volume of dioxan was heated on the steam bath for 20 minutes. 7 Parts by volume of 25% sodium hydroxide solution were then added and the mixture was further heated for 30 minutes. Dilution with water and acidification of the solution with concentrated hydrochloric acid yielded a brown oil which was extracted into diethyl ether. The ethereal solution was washed with water and dried over anhydrous magnesium sulphate. Evaporation of the solution yielded a gum which was added portionwise to 50 parts by volume of concentrated sulphuric acid at room temperature. After 15 minutes the acid solution was poured into water and a buff solid was precipitated. This was collected, dried and refluxed overnight in 40 parts by volume of dry ethanol in the presence of 3 drops of concentrated sulphuric acid. The ethanolic solution was evaporated *in vacuo* and the residue was taken up in 100 parts by volume of chloroform. The chloroform solution was washed with aqueous sodium bicarbonate solution, water and then dried over anhydrous magnesium sulphate. The concentrated chloroform solution was chromatographed in a batchwise manner on large scale (20 cm. x 100 cm.) Kieselgel $HF_{254}$ preparative layer plates using chloroform as developing solvent and two "passes" per plate. The main bands were collected and eluted with ethyl acetate. Evaporation *in vacuo* yielded a residue of ethyl 6-(3 - acetyl - 4 - hydroxybenzyl)-4-oxo-4H-1-benzopyran-2-carboxylate which crystallised from ethanol as platelets (0.958 parts) melting at 159°.

*Analysis.*—Found: C, 68.89; H, 4.89%. $C_{21}H_{18}O_6$ requires: C, 68.84; H, 4.95%.

(d) 6-(3 - Acetyl-4-hydroxybenzyl)-4-oxo-4H-1-benzopyran-2-carboxylic acid.—A solution of 1.68 parts of sodium bicarbonate in 10 parts by volume of water was added to a solution of 0.56 parts of ethyl 6-(3-acetyl-4-hydroxybenzyl)-4-oxo-4H-1-benzopyran-2-carboxylate in 50 parts by volume of ethanol. The mixture was heated on the steam bath. Further amounts of water were added as the hydrolysis proceeded. When the ethanol had evaporated off the solution was diluted with water and washed three times with diethyl ether. Acidification of the aqueous solution with concentrated hydrochloric acid precipitated the product as a pale yellow solid which crystallised from ethanol as minute needles (0.40 parts) melting between 274° and 275.5° with decomposition.

(e) 6-(3 - Acetyl-4-hydroxybenzyl)-4-oxo-4H-1-benzopyran-2-carboxylic acid sodium salt. 0.070 parts of sodium bicarbonate were added to a suspension of 0.284 parts of 6-(3-acetyl-4-hydroxybenzyl)-4-oxo-4H-1-benzopyran-2-carboxylic acid in 50 parts by volume of water. When solution of the acid was complete the solution was filtered and freeze dried to yield 0.305 parts of the sodium salt.

EXAMPLE 8

6-(4-Hydroxybenzyl)-4-oxo-4H-1-benzopyran-2-carboxylic acid sodium salt (a) 6-(4-Hydroxybenzyl)-4-oxo-4H - 1 - benzopyran-2-carboxylic acid ethyl ester.—1.94 parts of sodium were dissolved in 50 parts by volume of dry ethanol. To this solution was slowly added, with stirring, a solution of 4.84 parts of slightly impure 3-acetyl-4,4'-dihydroxydiphenylmethane and 9.3 parts of diethyl oxalate in 25 parts by volume of dry diethyl ether. The mixture was refluxed for 4 hours, with the exclusion of atmospheric moisture, and then poured into 200 parts by volume of 2N hydrochloric acid. The mixture was extracted three times with diethyl ether and the combined extracts were evaporated. The residual oil was refluxed in 20 parts by volume of ethanol and 2 parts by volume of concentrated hydrochloric acid for 1 hour. Evaporation *in vacuo* yielded an oil which was taken up in ethyl acetate and washed with aqueous sodium bicarbonate solution and water. The ethyl acetate solution was dried over anhydrous magnesium sulphate and evaporated *in vacuo* to yield an oily solid residue. Half of this residue was dissolved in 500 parts by volume of chloroform and the solution was extracted with 50 parts by volume of 1% sodium hydroxide solution. Acidification of the alkaline extract yielded 6-(4-hydroxybenzyl)-4-oxo-4H - 1 - benzopyran-2-carboxylic acid as a yellow solid which was crystallised twice from ethanol as minute yellow needles (0.93 parts) melting between 266° and 268° C.

*Analysis.*—Found: C, 69.16; H, 4.25%. $C_{17}H_{12}O_5$ requires: C, 68.95; H, 4.05%.

The remainder of the oily residue was purified in a batchwise manner by large scale (20 cm. x 100 cm.) preparative layer chromatography (Kieselgel $HF_{254}$) with chloroform as the developing solvent and three "passes" per plate. Elution of the main bands with ethyl acetate, removal of the solvent *in vacuo* and crystallisation of the residue from ethanol yielded 1.0 part of ethyl 6-(4-hydroxybenzyl)-4-oxo-4H-1-benzopyran - 2 - carboxylate as colourless crystals melting between 176° and 177° C.

*Analysis.*—Found: C, 70.56; H, 5.08%. $C_{19}H_{16}O_5$ requires: C, 70.36; H, 4.94%.

(b) 6-(4-Hydroxybenzyl)-4-oxo-4H - 1 - benzopyran-2-carboxylic acid sodium salt.—A solution of 0.130 parts of sodium bicarbonate in 10 parts by volume of water was added to a suspension of 0.494 parts of 6-(4-hydroxybenzyl)-4-oxo-4H - 1 - benzopyran-2-carboxylic acid in 20 parts by volume of water. The mixture was heated for a short while and filtered whilst hot. On cooling the sodium salt of 6-(4-hydroxybenzyl)-4-oxo-4H - 1 - benzopyran-2-carboxylic acid crystallised out as colourless needles (0.360 parts).

EXAMPLE 9

6-(3-Acetyl-4-hydroxyphenylthio)-4-oxo-4H-1-benzopyran-2-carboxylic acid (a) Ethyl 6-(3-acetyl - 4 - hydroxyphenylthio)-4-oxo-4H-1-benzopyran-2-carboxylate.—A solution of 1.1 parts of 6,6'-thiobis(2-carboxy-4-oxo-4H-1-benzopyran) and 0.33 parts of sodium hydroxide in 50 parts of water was heated under reflux for 6 hours. After cooling the solution was acidified with dilute hydrochloric acid and the yellow precipitate was filtered off, washed with water and dried. To this solid (1.0 parts) was added 60 parts of dry ethanol, 20 parts of benzene and 1.0 parts of concentrated sulphuric acid. The mixture was heated under reflux for 30 hours. The resulting solution was reduced in volume by evaporation and then poured onto ice. The suspension was filtered and the residue washed with water and crystallised from ethanol to give 0.6 parts of yellow plates. Nuclear magnetic resonance spectroscopy indicated that this material was a mixture of ethyl 6-(3 - acetyl - 4 - hydroxyphenylthio)-4-oxo-4H-1-benzopyran-2-carboxylate and 6,6'-thiobis(2-carboxy - 4 - oxo-4H-1-benzopyran), diethyl ester.

0.6 Parts of the above mixture was subjected to preparative thin layer chromatography using silica as the adsorbant and chloroform as the eluent. Two bands separated and the one with the larger Rf value was extracted from the silica with chloroform. Evaporation of the solution gave 0.13 parts of ethyl 6-(3-acetyl-4-hydroxyphenylthio)-4-oxo-4H-1-benzopyran - 2 - carboxylate as a yellow solid, melting point 171–3° C.

EXAMPLE 10

6-(4-Hydroxyphenoxy)-4-oxo-4H-1-benzopyran-2-carboxylic acid

A solution of 0.268 parts of 6-(4-hydroxyphenoxy)-2-methyl-4-oxo-4H-1-benzopyran and 0.445 parts of selenium dioxide in a mixture of 6 parts of water and 24 parts by volume of dioxan was heated under gentle reflux for 12 hours. After cooling, the solution was filtered and the solvents evaporated from the filtrate. The residue thus produced was dissolved in 100 parts by volume of chloroform and the resulting solution extracted with 3 portions of 30 parts of a solution containing 5 parts of sodium bicarbonate in 100 parts of water. The combined aqueous washings were acidified with concentrated hydrochloric acid to give a solid which was recrystallised from an ethanol-acetone mixture to give 6-(4-hydroxyphenoxy)-4-oxo-4H-1 - benzopyran - 2 - carboxylic acid, m.p. 280–281° (decomp.).

EXAMPLE 11

6-(4-Hydroxybenzyl)-4-oxo-4H-1-benzopyran-2-carboxylic acid

A mixture of 1.0 parts of 6-(4-hydroxybenzyl)-4-oxo-4H-1-benzopyran - 2 - carboxamide, 20 parts of glacial acetic acid, and 20 parts of a solution of hydrogen bromide (45% weight/volume) in glacial acetic acid was heated under reflux for 3 hours, then added to 200 parts of water, and the resulting aqueous solution extracted with chloroform. The chloroform washing was extracted with saturated aqueous sodium bicarbonate solution, followed by acidification of the aqueous layer giving a yellow solid which was crystallised from ethanol giving 6-(4-hydroxybenzyl)-4-oxo-4H-1-benzopyran - 2 - carboxylic acid, m.p. 266–268°.

EXAMPLE 12

6-(3-acetyl-4-hydroxyphenoxy)-4-oxo-4H-1-benzopyran-2-carboxylic acid

A mixture of 1.0 parts of 6-(3-acetyl-4-hydroxyphenoxy)-4-oxo-4H-1-benzopyran - 2 - carbonitrile, 20 parts of dioxan and 20 parts of dilute hydrochloric acid was heated under gentle reflux for 12 hours. The dioxan was evaporated, and the reaction mixture extracted with chloroform. The chloroform layer was extracted with saturated sodium bicarbonate solution which on acidification gave 6-(3 - acetyl-4-hydroxyphenoxy)-4-oxo-4H-1-benzopyran-2-carboxylic acid, m.p. 287° (decomp.).

EXAMPLE 13

Ethyl 6-(4-hydroxyphenoxy)-4-oxo-4H-1-benzopyran-2-carboxylate

A mixture of 0.315 parts of ethyl 6-(4 - hydroxyphenoxy)-2, 3-dihydro - 4 - oxo-4H-1-benzopyran-2-carboxylate and 0.184 parts of N-bromo-succinimide in 15 parts by volume of carbon tetrachloride were heated under reflux for 6 hours. The resulting solution was washed with water and the organic layer dried over sodium sulphate. Evaporation of the carbon tetrachloride gave a buff solid which was crystallised from aqueous ethanol to give ethyl 6-(4-hydroxyphenoxy) - 4 - oxo-4H-1-benzopyran-2-carboxylate, m.p. 159–160° C.

EXAMPLE 14

6-(3-Allyl-4-hydroxyphenylthio)-4-oxo-4H-1-benzopyran-2-carboxylic acid sodium salt (a) Ethyl 6 - (4 - allyloxyphenylthio) - 4 - oxo-4H-1-benzopyran - 2 - carboxylate.—A mixture of 19.1 parts ethyl 6-(4-hydroxyphenylthio)-4-oxo-4H-1-benzopyran-2-carboxylate (Example 2(b)), 8 parts allyl bromide, 60 parts dry potassium carbonate, 1 part potassium iodide, and 600 parts dry acetone was heated at reflux for 24 hours. On cooling, the solids were filtered off, the filtrate evaporated to an orange oil, and this was chromatographed in chloroform from a column of 500 parts silica gel. The solid, from evaporation of the appropriate chromatographic fractions, was recrystallised from ethanol to obtain 17.5 parts ethyl 6-(4-allyloxyphenylthio) - 4 - oxo-4H-1-benzopyran - 2 - carboxylate as pale yellow needles melting between 69° and 69.5° C.

Analysis.—Found: C, 65.8; H, 4.9; S, 8.6. $C_{21}H_{18}O_5S$ requires: C, 66.0; H, 4.75; S, 8.4.

(b) Ethyl 6-(3-Allyl - 4 - hydroxyphenylthio)-4-oxo-4H - 1 - benzopyran - 2 - carboxylate.—14 parts ethyl 6-(4-allyloxyphenylthio) - 4 - oxo - 4H - 1 - benzopyran-2-carboxylate were heated at 210° C. for 8 hours under a stream of nitrogen. The brown residue was then chromatographed in chloroform from a column of 300 parts silica gel. Evaporation of the appropriate fractions gave a solid which was recrystallised from ethanol to obtain 9 parts ethyl 6-(3-allyl - 4 - hydroxyphenylthio)-4-oxo-4H-1-benzopyran - 2 - carboxylate as yellow crystals melting between 170.5° and 171.5° C.

Analysis.—Found: C, 65.8; H, 4.9; S, 8.5. $C_{21}H_{18}O_5S$ requires: C, 66.0; H, 4.75; S, 8.4.

(c) 6-(3-Allyl - 4 - hydroxyphenylthio) - 4 - oxo-4H-1-benzopyran - 2 - carboxylic acid.—By the method of Example 2(c), 5 parts of ethyl 6-(3-allyl - 4 - hydroxyphenylthio) - 4 - oxo - 4H - 1 - benzopyran - 2 - carboxylate were reacted with sodium hydrogen carbonate to obtain, after acidification and the recrystallisation from ethyl acetate, 2.8 parts of 6-(3-allyl - 4 - hydroxyphenylthio) - 4 - oxo - 4H - 1 - benzopyran - 2 - carboxylic acid as yellow crystals melting between 242° C. and 244° C. (decomp.).

Analysis.—Found: C, 64.5; H, 4.2; S, 9.0. $C_{19}H_{14}O_5S$ requires: C, 64.4; H, 4.0; S, 9.05.

(d) 6-(3-Allyl - 4 - hydroxyphenylthio) - 4 - oxo-4H-1-benzopyran - 2 - carboxylic acid sodium salt.—By the method of Example 2(d), 2.15 parts of 6-(3-allyl-4-hydroxyphenylthio) - 4 - oxo - 4H - 1 - benzopyran-2-carboxylic acid were reacted with aqueous sodium hydrogen carbonate to obtain, after freeze drying, 2 parts of 6-(3-allyl - 4 - hydroxyphenylthio) - 4 - oxo - 4H - 1 - benzopyran - 2 - carboxylic acid sodium salt as a pale yellow solid.

EXAMPLE 15

Ethyl 6-(3-acetyl-4-hydroxyphenylthio)-4-oxo-4H-1-benzopyran-2-carboxylate (a) Ethyl 6-(4-acetoxyphenylthio) - 4 - oxo - 4H - 1-benzopyran - 2 - carboxylate.—A mixture of 5.8 parts ethyl 6-(4-hydroxyphenylthio) - 4 - oxo - 4H - 1 - benzopyran - 2 - carboxylate, 5 parts acetic anhydride, and 25 parts dry pyridine was maintained at 20° C. for 1 hour. The solution was acidified with dilute hydrochloric acid and was then extracted twice with 200 parts chloroform. The extract was washed with dilute hydrochloric acid, water, and then dried with magnesium sulphate. The residue after evaporation of the solvent was twice recrystallised from ethanol to obtain 2.15 parts of ethyl 6-(4-acetoxyphenylthio) - 4 - oxo - 4H - 1 - benzopyran-2-carboxylate as fluffy white crystals melting between 83° C. and 84° C.

(b) Ethyl 6-(3-acetyl - 4 - hydroxyphenylthio)-4-oxo-4H-1-benzopyran - 2 - carboxylate.—A mixture of 6.2 parts ethyl 6-(4-acetoxyphenylthio) - 4 - oxo-4H-1-benzopyran - 2 - carboxylate and 100 parts nitrobenzene was stirred at 0° C. and to this was added 6.9 parts by volume of titanic chloride during 1 minute. The mixture was then heated at 50° C. for 3 hours and, on cooling, the dark red complex was decomposed by the addition of dilute hydrochloric acid. The organic layer was washed with water and steam distilled to remove nitrobenzene. The residue was extracted into chloroform, dried with magnesium sulphate, evaporated to dryness, and chromatographed in chloroform through a column of 250 parts silica gel. The resulting product was recrystallised from ethanol to obtain 1.9 parts of ethyl 6-(3-acetyl-4-hydroxyphenylthio) - 3 - oxo-4H-1-benzopyran - 2 - carboxylate as pale yellow crystals melting between 172° C. and 173° C.

EXAMPLE 16

6-(4-Hydroxy-3-n-propylphenylthio)-4-oxo-4H-1-benzopyran-2-carboxylic acid sodium salt (a) Ethyl - 6 - (4 - hydroxy-3-$n$-propylphenylthio)-4-oxo - 4H - 1 - benzopyran - 2 - carboxylate.—A mixture of 5 parts ethyl 6-(3-allyl - 4 - hydroxy-phenylthio)-4-oxo - 4H - 1 - benzopyran - 2 - carboxylate, 0.1 parts 5% palladium/charcoal catalyst, and 100 parts ethyl acetate at 20° was hydrogenated for 1 hour at 1 atmosphere over pressure with constant agitation. The catalyst was filtered off, the solvent was removed by evaporation, and the residual oil was recrystallised from ethanol to obtain 4.1 parts ethyl 6-(4-hydroxy - 3 - $n$ - propylphenylthio) - 4 - oxo - 4H - 1 - benzopyran - 2 - carboxylate as pale yellow crystals melting between 151° C. and 152° C.

(b) 6-(4-Hydroxy-3-$n$-propylphenylthio)-4-oxo-4H-1-benzopyran-2-carboxylic acid sodium salt.—A mixture of 2 parts ethyl 6(4-hydroxy-3-$n$-propylphenylthio)-4-oxo-4H-1-benzopyran-2-carboxylate, 0.42 parts sodium hydrogen carbonate, 30 parts ethanol, and 30 parts water was maintained at 60° for 2 hours. Ethanol was removed by evaporation in vacuo and the solution was extracted with ethyl acetate to remove unreacted starting material.

The aqueous layer was freeze dried to obtain 6-(4-hydroxy-3-n-propylphenylthio)-4-oxo-4H-1-benzopyran-2-carboxylic acid sodium salt.

We claim:
1. A member of the group consisting of
(A) A compound of the formula

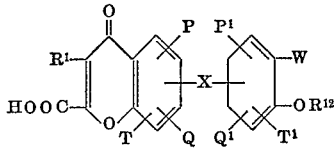

wherein
P, Q, T, P¹, Q¹ and T¹ are the same or different and each is selected from the group consisting of (a) hydrogen, (b) alkenyloxy of 1 to 8 carbon atoms, (c) alkyl of 1 to 8 carbon atoms, (d) alkenyl of 1 to 8 carbon atoms, (e) alkoxy of 1 to 8 carbon atoms, (f) alkyl, alkoxy, alkenyl or alkenyloxy of 1 to 8 carbon atoms substituted by hydroxy, lower alkoxy or halo, (g) amino, (h) mono- or di- lower alkyl amino, (i) amino-lower alkoxy, (j) di-lower alkyl amino-lower alkoxy, (k) nitro, (l) hydroxy and (m) halogen X is a carbon to carbon bond, —S—, —O—, —CH₂—, —SO—, —SO₂—, —CO—, —NH—, >NR², >C(R³)₂, or >C=S, R² contains less than 10 carbon atoms and is a member of the group of (a) alkyl, (b) alkenyl, (c) alkoxy, (d) alkyl, alkenyl or alkoxy substituted by hydroxy, halogen, lower alkyl, lower alkoxy or phenyl, (e) hydroxy and (f) carboxy, the group C(R³)₂ contains less than 10 carbon atoms, each R³ is the same or different and is a member of the group of (a) hydrogen, (b) hydroxy, (c) alkyl, (d) alkenyl, (e) alkynyl, (f) alkyl, alkenyl or alkynyl substituted by halogen, hydroxy, carboxy or alkoxy, (g) carboxy, (h) lower alkoxy carbonyl, (i) pyridyl, and (j), the two R³ groups together form the =CCl₂ group, R¹ is lower alkyl, lower alkoxy, phenyl, or hydrogen,
R¹² is hydrogen, —COCH₂R¹ wherein R¹ is as defined above, allyl, or alkyl allyl of up to 6 carbon atoms, and
W is hydrogen or —COCH₂R¹ wherein R¹ is as defined above, and (B) A pharmaceutically acceptable salt, lower alkyl ester, unsubstituted amide or glycine amide thereof.

2. A compound according to claim 1, wherein all R¹ groups are hydrogen.

3. A compound according to claim 1, wherein the —X— group is a sulphur or oxygen atom or a —CH₂— group, both R¹ groups are hydrogen and all of P, Q, T, P¹, Q¹ and T¹ are hydrogen, or only one of P, Q, T, P¹, Q¹ and T¹ is lower alkoxy, lower alkyl or lower alkenyl.

4. A compound according to claim 1 in the form of a pharmaceutically acceptable salt thereof.

5. A compound according to claim 1, said compound being 6-(3-acetyl-4-hydroxyphenylthio)-4-oxo-4H-1-benzopyran-2-carboxylic acid.

6. A compound according to claim 1, said compound being 6-(4-hydroxyphenylthio)-4-oxo-4H-1-benzopyran-2-carboxylic acid.

7. A compound according to claim 1, said compound being 6-(4-acetyl-3-hydroxyphenylthio)-4-oxo-4H-1-benzopyran-2-carboxylic acid.

8. A compound according to claim 1, said compound being 6-(5-acetyl-4-hydroxy-2-methoxyphenylthio)-4-oxo-4H-1-benzopyran-2-carboxylic acid.

9. A compound according to claim 1, said compound being 6-(4-hydroxyphenoxy)-4-oxo-4H-1-benzopyran-2-carboxylic acid.

10. A compound according to claim 1, said compound being 6-(4-acetoxyphenylthio)-4-oxo-4H-1-benzopyran-2-carboxylic acid.

11. A compound according to claim 1, said compound being 6-(4-allyloxyphenylthio)-4-oxo-4H-1-benzopyran-2-carboxylic acid.

12. A compound according to claim 1, said compound being 6-(3-acetyl-4-hydroxyphenoxy)-4-oxo-4H-1-benzopyran-2-carboxylic acid.

13. A compound according to claim 1, said compound being 6-(3-acetyl-4-hydroxybenzyl)-4-oxo-4H-1-benzopyran-2-carboxylic acid.

14. A compound according to claim 1, said compound being 6-(4-hydroxybenzyl)-4-oxo-4H-1-benzopyran-2-carboxylic acid.

15. A compound according to claim 1, said compound being 6-(3-allyl-4-hydroxyphenylthio)-4-oxo-4H-1-benzopyran-2-carboxylic acid.

16. A compound according to claim 1, said compound being 6-(4-hydroxy-3-n-propylphenylthio)-4-oxo-4H-1-benzopyran-2-carboxylic acid.

References Cited
UNITED STATES PATENTS
3,720,690   3/1973   King et al. _____ 260—345.2

JOHN M. FORD, Primary Examiner

U.S. Cl. X.R.

260—345.5; 424—283